United States Patent
Lan (10) Patent No.: US 8,985,925 B2
(45) Date of Patent: Mar. 24, 2015

(54) INSERT NUT STRUCTURE, NUT AND SHELL ASSEMBLY AND METHOD FOR ASSEMBLING NUT AND SHELL ASSEMBLY

(75) Inventor: Chang-Feng Lan, New Taipei (TW)

(73) Assignee: Wistron Corporation, New Taipei (TW)

( * ) Notice: Subject to any disclaimer, the term of this patent is extended or adjusted under 35 U.S.C. 154(b) by 240 days.

(21) Appl. No.: 13/482,242

(22) Filed: May 29, 2012

(65) Prior Publication Data

US 2013/0031765 A1 Feb. 7, 2013

(30) Foreign Application Priority Data

Aug. 3, 2011 (TW) .............................. 100127580 A (51) Int. Cl.
F16B 39/00 (2006.01)
F16B 33/00 (2006.01)
F16B 37/06 (2006.01)

(52) U.S. Cl.
CPC ............. F16B 33/004 (2013.01); F16B 37/061 (2013.01)
USPC ........................................................ 411/180

(58) Field of Classification Search
USPC ........................................................ 411/180
IPC ............................... F16B 37/048, 37/061, 37/06
See application file for complete search history.

(56) References Cited

U.S. PATENT DOCUMENTS

| | | | | |
|---|---|---|---|---|
| 4,448,565 A | * | 5/1984 | Peterson .................... | 403/408.1 |
| 4,509,308 A | * | 4/1985 | Dettfurth et al. ............. | 52/787.1 |
| 4,919,461 A | * | 4/1990 | Reynolds ................. | 285/148.13 |
| 4,938,314 A | * | 7/1990 | Sitzler et al. ................... | 184/1.5 |
| 4,951,783 A | * | 8/1990 | Kamprath et al. ............. | 184/1.5 |
| 5,266,258 A | * | 11/1993 | Martin .......................... | 264/249 |
| 5,360,304 A | | 11/1994 | Notaro et al. | |
| 5,427,063 A | * | 6/1995 | Anderson ................... | 123/48 A |
| 5,673,927 A | * | 10/1997 | Vermillion .................... | 280/611 |
| 6,036,420 A | | 3/2000 | Somers et al. | |
| 7,527,463 B2 | * | 5/2009 | Wang et al. ..................... | 411/82 |
| 8,348,090 B2 | * | 1/2013 | Crager et al. ................. | 220/661 |
| 8,444,356 B2 | * | 5/2013 | Crutchley et al. ............. | 411/107 |
| 2005/0115732 A1 | | 6/2005 | Tu | |
| 2010/0175811 A1 | | 7/2010 | Kumai | |

FOREIGN PATENT DOCUMENTS

| | | |
|---|---|---|
| CN | 2694026 Y | 4/2005 |
| CN | 2756885 Y | 2/2006 |
| CN | 101808811 A | 8/2010 |

OTHER PUBLICATIONS

Communication regarding Taiwanese patent application 100127580 and translation.

(Continued)

*Primary Examiner* — Gary Estremsky
(74) *Attorney, Agent, or Firm* — Hunton & Williams LLP (57) ABSTRACT

A nut and shell assembly includes a shell and an inset nut structure. The shell has an inner surface that defines an inner shell space and a through hole to communicate the inner shell space with the outside. The insert nut structure includes an insert nut fixed in the through hole, and an elastic seal sleeved on the insert nut and in substantially tight contact with the shell in the through hole. The insert nut includes a columnar body fixed in the through hole, and a flange connected to one end of the columnar body. The flange has an outer diameter greater than that of the columnar body, and abuts against the inner surface of the shell.

8 Claims, 9 Drawing Sheets

(56) References Cited

OTHER PUBLICATIONS

CN 101808811A—Jan. 16, 2014 Communication from Chinese Patent Office.

The Office Action issued to Chinese Counterpart Application No. 201110240717.X by the State Intellectual Property Office of the P.R.C on Jul. 23, 2014, along with an English translation of the sections boxed in red.

* cited by examiner

INSERT NUT STRUCTURE, NUT AND SHELL ASSEMBLY AND METHOD FOR ASSEMBLING NUT AND SHELL ASSEMBLY

CROSS-REFERENCE TO RELATED APPLICATION

This application claims priority to Taiwanese Application No. 100127580, filed on Aug. 3, 2011, the disclosure of which is incorporated herein by reference.

BACKGROUND OF THE INVENTION

1. Field of the Invention

The invention relates to a nut structure, more particularly an insert nut structure, a nut and shell assembly and a method for assembling the nut and shell assembly.

2. Description of the Related Art

Conventionally, an insert nut is usually fixed into a blind hole of a plastic unit by heating and pressuring. A bolt can then be screwed to a screw hole in the insert nut for fixing an object. Since the insert nut is only fixed to the plastic unit by heating and pressuring, the insert nut has an insufficient resistance force against screw pull-out when a bolt is screwed to the insert nut.

Further, the applications of the nut differ depending on actual requirement. As such, how to conceptualize a structural design that can permit airtight and waterproof effects between a nut and a plastic unit when the nut is heated and fixed in a hole of the plastic unit becomes the subject of improvement of the present invention.

SUMMARY OF THE INVENTION

Therefore, an object of the present invention is to provide an insert nut structure that can be be fixed conveniently to a shell and to increase a resistance force against screw pull-out, and to achieve a good waterproof effect.

According to one aspect of this invention, an insert nut structure includes an insert nut and an elastic seal sleeved on the insert nut. The insert nut includes a columnar body, and a flange connected to one end of the columnar body and having an outer diameter greater than that of the columnar body.

Preferably, the columnar body has an outer surface formed with a groove. The elastic seal is received engagingly in the groove.

Preferably, the elastic seal is sleeved on the columnar body and abuts against the flange.

Preferably, the columnar body has an outer surface formed with a groove proximate to a junction of the flange and the columnar body. The elastic seal is received engagingly in the groove.

Preferably, the elastic seal is made of one of natural rubber and synthetic rubber.

Preferably, the columnar body and the flange are integrally formed.

Another object of the present invention is to provide a nut and shell assembly that includes a shell and an insert nut structure. The insert nut structure can be be fixed conveniently to the shell to increase a resistance force against screw pull-out and to achieve a good waterproof effect.

According to another aspect of this invention, a nut and shell assembly includes a shell and an insert nut structure. The shell has an inner surface that defines an inner shell space, and a through hole to communicate the inner shell space with the outside. The insert nut structure includes an insert nut to be fixed in the through hole, and an elastic seal sleeved on the insert nut and in substantially tight contact with the shell in the through hole. The insert nut includes a columnar body fixed in the through hole, and a flange connected to one end of the columnar body. The flange has an outer diameter greater than that of the columnar body, and abuts against the inner surface of the shell. The insert nut has a T-shaped cross section. A thermal welding method for assembling the insert nut to the shell is accomplished by hot-melting from an interior to an exterior of the shell, which is different from the conventional hot coupling methods. Hence, the flange of the insert nut will abut against the inner surface of the shell. When a bolt is screwed to the insert nut from the exterior of the shell, a strong resistance force against screw pull-out can be provided. This makes it different from the conventional insert nuts.

Preferably, the shell further has a hole-defining wall that defines the through hole. The elastic seal is in substantially tight contact with the hole-defining wall when the insert nut is fixed in the through hole.

Preferably, the insert nut has an outer surface formed with a groove. The elastic seal is received engagingly in the groove.

Preferably, the elastic seal is sleeved on the columnar body and is in substantially tight contact with and is disposed between the flange of the insert nut and the inner surface of the shell.

Preferably, the insert nut has an outer surface formed with a groove proximate to a junction of the flange and the columnar body. The elastic seal is received engagingly in the groove.

Preferably, the elastic seal is made of one of natural rubber and synthetic rubber.

Preferably, the columnar body and the flange are integrally formed.

Yet another object of the present invention is to provide a method for assembling an insert nut and a shell. The insert nut can be fixed conveniently to the shell to increase a resistance force against screw pull-out and to achieve waterproof effect.

According to yet another aspect of this invention, a method for assembling an insert nut and a shell, where the shell has an inner surface and a through hole, and where the insert nut includes a flange, includes the steps of sleeving an elastic seal on the insert nut and fixing the insert nut to and in the through hole by thermal welding such that the elastic seal is in substantially tight contact with a hole-defining wall of the shell that defines the through hole, and such that the flange is in substantially tight contact with the inner surface of the shell.

The effect of the present invention resides in that because the flange of the nut abuts against the inner surface of the shell, a strong resistance force against screw pull-out can be provided. Further, because the elastic seal of the insert nut structure is in tight contact with the shell to achieve an airtight requirement, external water can be prevented from entering the shell.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Referring to FIGS. 1 to 4, a nut and shell assembly 100 according to the embodiment of the nut and shell assembly of the present invention comprises a shell 1 and an insert nut structure 2.

Figure 1:
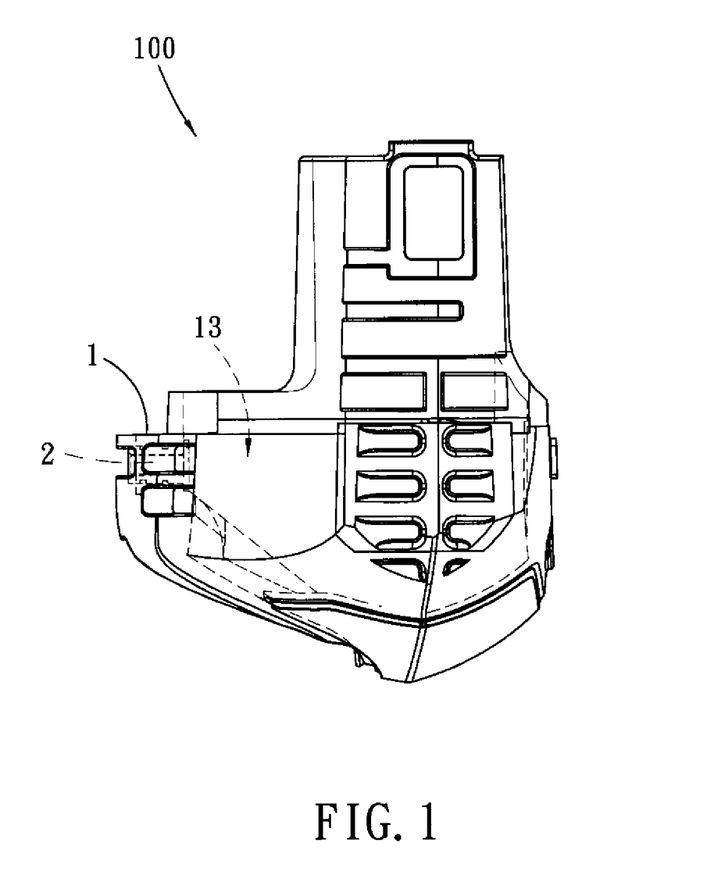
FIG. 1 is a schematic side view of a nut and shell assembly according to the embodiment of the present invention.
Figure 2:
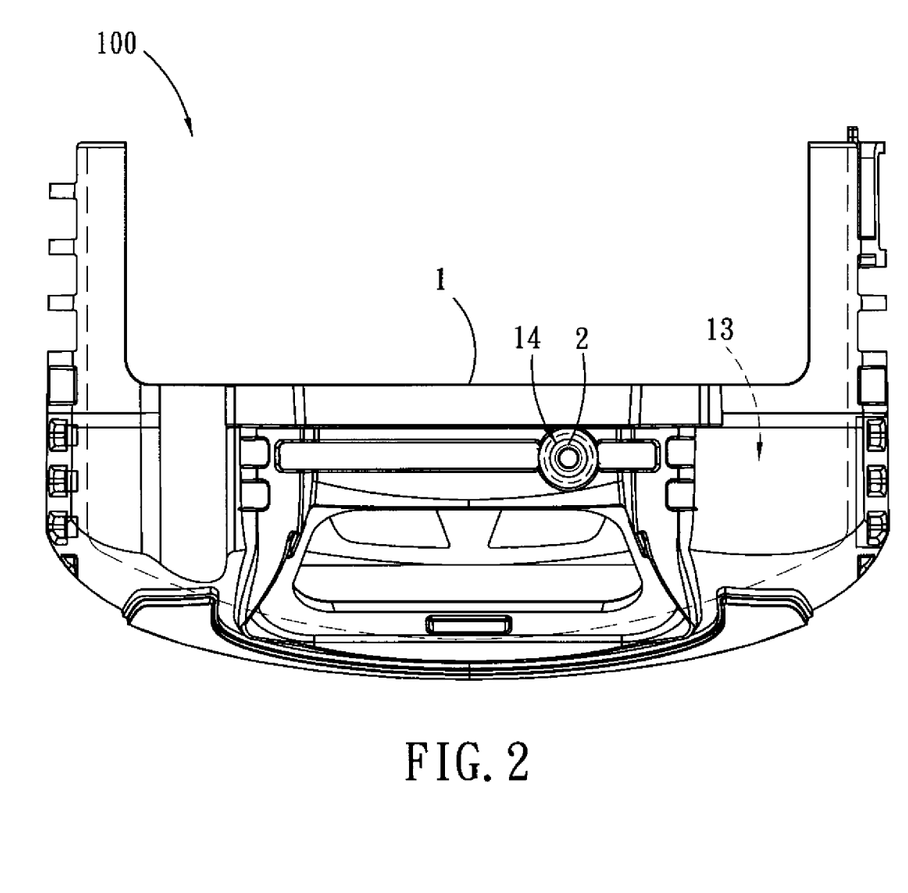
FIG. 2 is a schematic front view of the embodiment.
Figure 3:
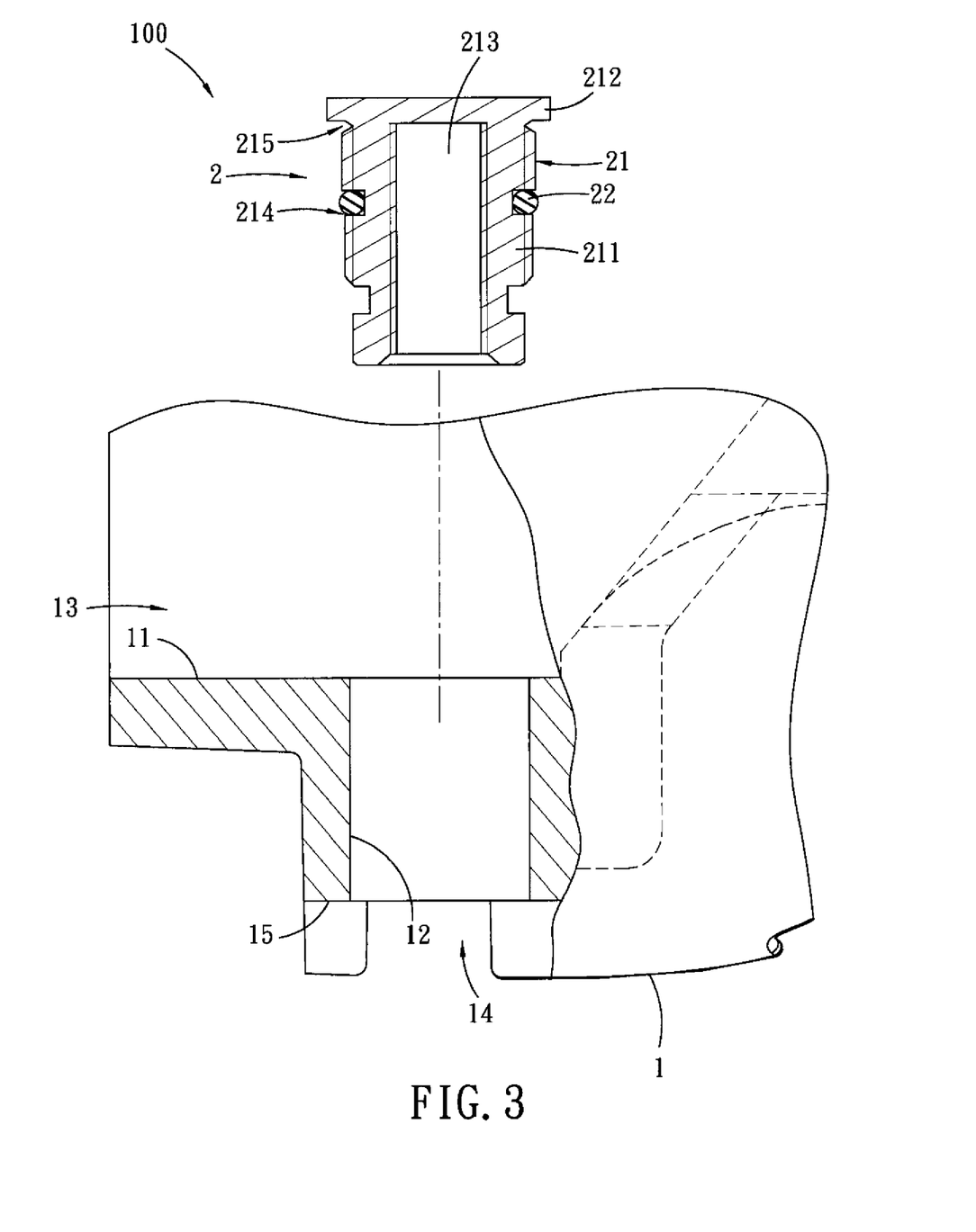
FIG. 3 is a partly sectional view of the embodiment prior to assembly.

With reference to FIG. 3, the shell 1 has an inner surface 11 that defines an inner shell space 13, an outer surface 15, and a through hole 14 that penetrates the inner and outer surfaces 11, 15 such that the inner shell space 13 is connected spacedly to outside. The insert nut structure 2 includes an insert nut 21 insertedly fixed in the through hole 14, and an elastic seal 22 sleeved on an outer surface of the insert nut 21 and in substantially tight contact with the shell 1 in the through hole 14. Through this configuration, the waterproof effect between the insert nut structure 2 and the shell 1 can be achieved, so that external water can be prevented from entering the inner shell space 13 via the through hole 14.

In this embodiment, the shell 1 is made of a plastic material. The shell 1 further has a hole-defining wall 12 defining the through hole 14. The through hole 14 is circular.

The elastic seal 22 of the insert nut structure 2 is made of an elastic material. Because the elastic seal 22 can contact tightly with the hole-defining wall 12, a good airtight effect between the elastic seal 22 and the hole-defining wall 12 can be achieved.

Figure 4:
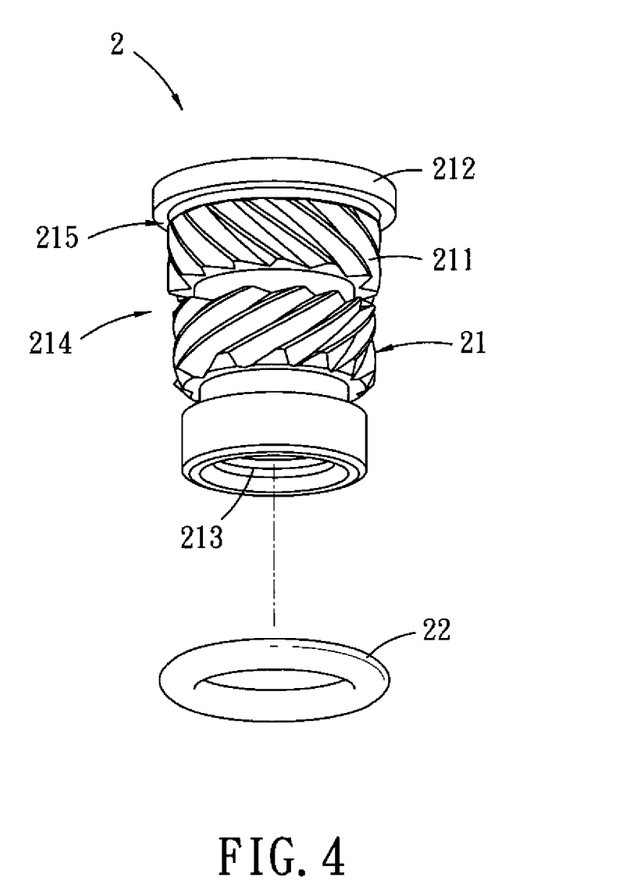
FIG. 4 is an exploded perspective view of an insert nut structure of the embodiment.

With reference to FIG. 4, the insert nut 21 includes a columnar body 211, and a flange 212 connected to one end of the columnar body 211 and abutting against the inner surface 11 of the shell 1 when the columnar body 211 is fixed in the through hole 14. An outer diameter of the columnar body 211 is slightly greater than that of the through hole 14. An outer diameter of the flange 212 is greater than that of the columnar body 211. The columnar body 211 and the flange 212 cooperatively define a screw-threaded hole 213 for receiving threadedly a bolt (not shown). The columnar body 211 has an outer surface formed with a first groove 214 that extends inwardly from the center thereof to receive engagingly the elastic seal 22. Through this configuration, the elastic seal 22 can be stably and fixedly sleeved on the columnar body 211 and cannot be easily disengaged therefrom.

Alternatively, the outer surface of the columnar body 211 may be further formed with a second groove 215 that is spaced apart from the first groove 214 and that is proximate to a junction of the flange 212 and the columnar body 211.

The elastic seal 22 is made of natural rubber, which has high elasticity and which can endure temperatures up to 250° C. The elastic seal 22 may also be made of silicone having similar properties as the natural rubber.

Figure 5:
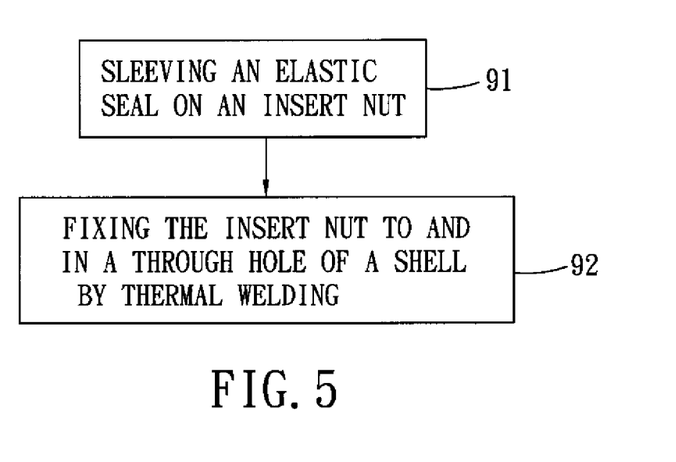
FIG. 5 is a flow diagram illustrating the steps involved in a method for assembling an insert nut and shell according to the embodiment of this invention.

A method for assembling the insert nut 21 and the shell 1 according to the embodiment of the present invention is described below with reference to FIGS. 5, 6, 7 and 8. FIG. 5 is a flow diagram of the method. The method includes steps 91 and 92.

In step 91, the elastic seal 22 is sleeved on the outer surface of the insert nut 2. In this embodiment, the elastic seal 22 is sleeved on the columnar body 211 of the insert nut 21 such that the elastic seal 22 is engagingly received in the first groove 214.

In step 92, the insert nut 21 and the elastic seal 22 are fixed in the through hole 14 of the shell 1 by thermal welding.

Figure 6:
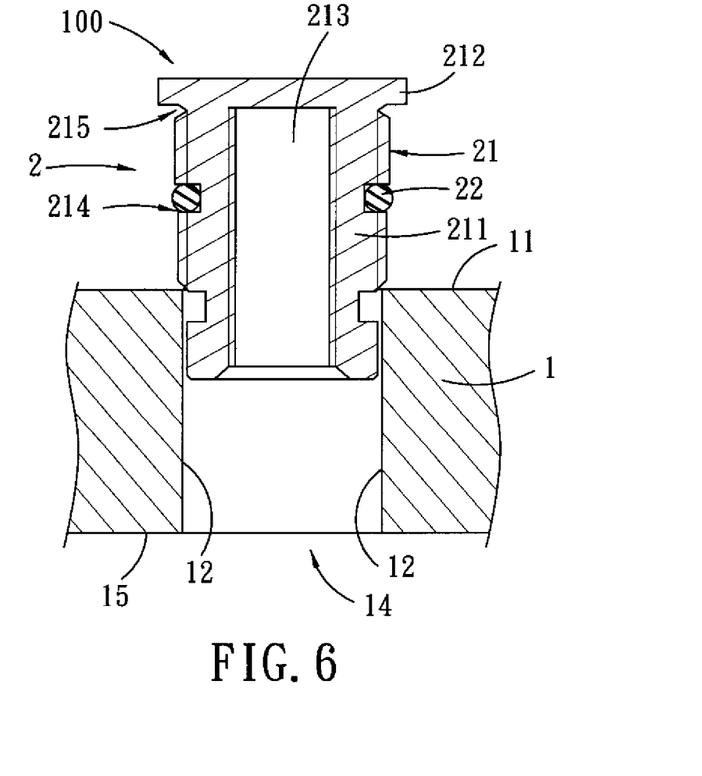
FIG. 6 is a fragmentary sectional view, illustrating the insert nut being inserted into a through hole of the shell.

As shown in FIG. 6, the insert nut structure 2 is first positioned in the through hole 14 of the shell 1. At this time, the columnar body 211 abuts the inner surface 11 of the shell 1, and a bottom end of the columnar body 211 extends into the through hole 14.

Figure 7:
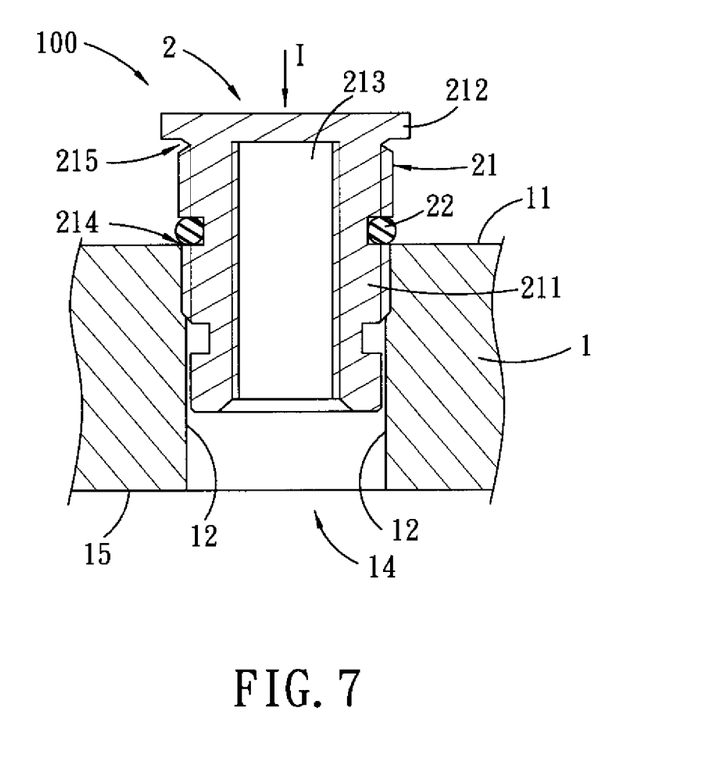
FIG. 7 is a view similar to FIG. 6, but with the insert nut being pressed further into the through hole of the shell.
Figure 8:
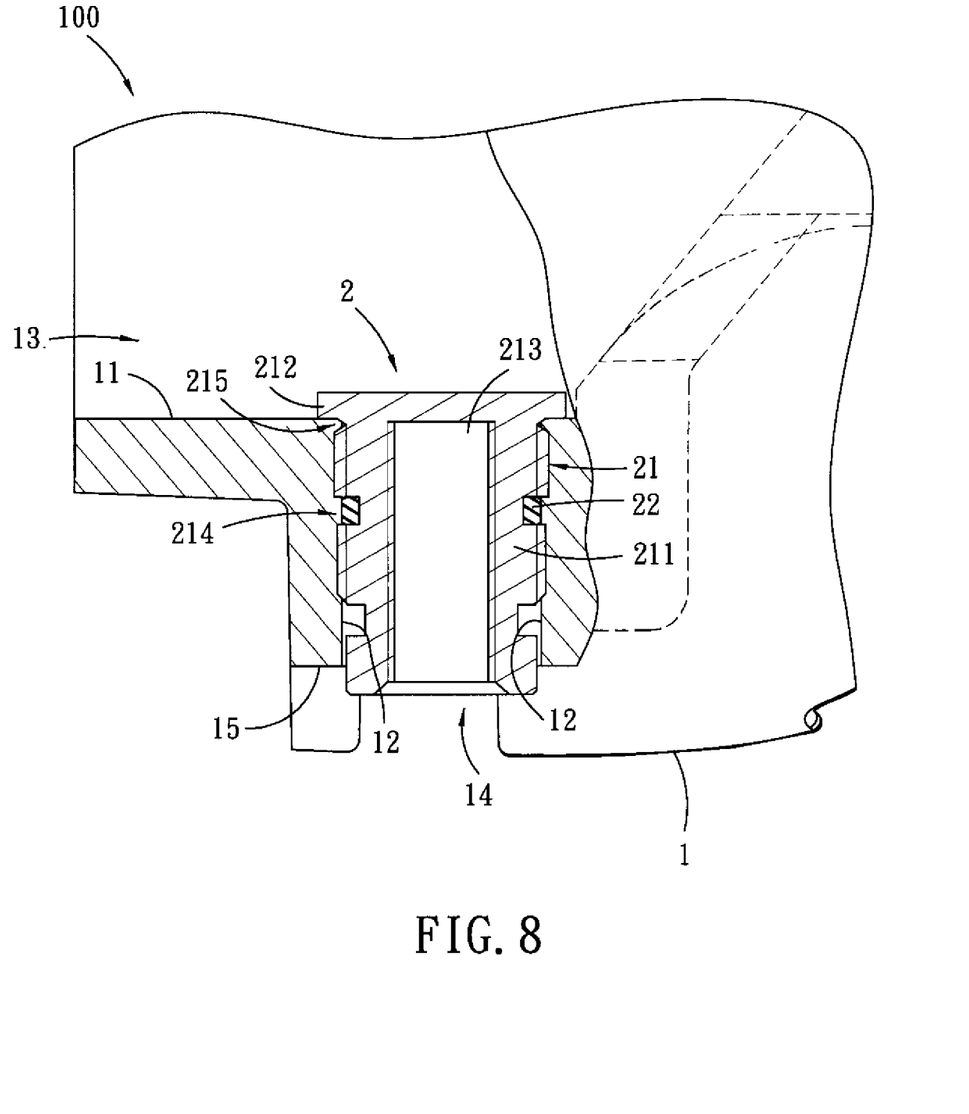
FIG. 8 is a fragmentary sectional view, illustrating the insert nut being pressed into the through hole of the shell until a flange thereof abuts against an inner surface of the shell.

With reference to FIGS. 7 and 8, alternatively, the flange 212 of the insert nut 21 is heated, for example, from 100° C. to 110° C., and is simultaneously pressed in the direction of an arrow (I). During heating and pressing of the insert nut 21, the heat causes certain parts of the shell 1 to melt so that the columnar body 211 of the insert nut 21 can smoothly extend into the through hole 14, and the elastic seal 22 can be compressed by the hole-defining wall 12 to extend into the through hole 14. When the flange 212 abuts against the inner surface 11 (see FIG. 8) of the shell 1, the insert nut 21 cannot be moved further. After the melted material has solidified, the elastic seal 22 is positioned in a substantially tight contact with the hole-defining wall 12. Thus, good airtight and waterproof effects can be achieved between the elastic sea 22 and the hole-defining wall 12.

After the assembly is completed, because the flange 212 abuts against the inner surface 11 of the shell 1, the insert nut 21 has a strong resistance force against screw pull-out, so that when a bolt is screwed to the insert nut 21, the insert nut 21 cannot be easily displaced.

Figure 9:
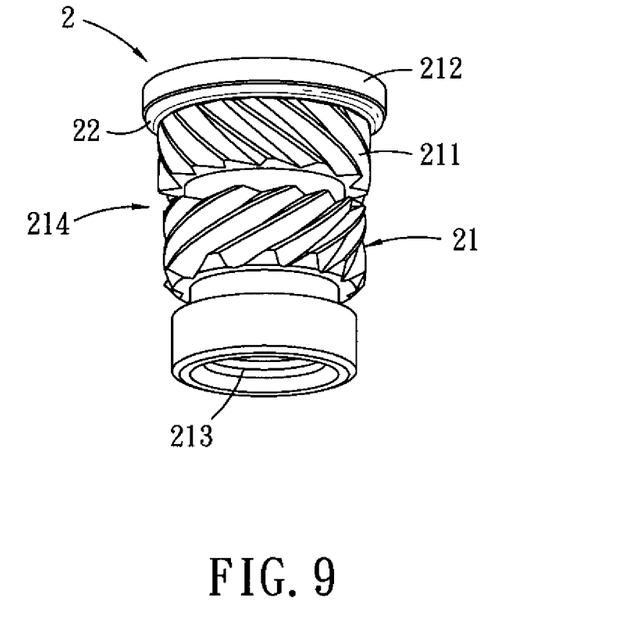
FIG. 9 is a perspective view, illustrating an alternative form of the insert nut structure of the embodiment.

FIG. 9 illustrates an alternative form of the insert nut structure 2. In this embodiment, the elastic seal 22 is sleeved on the columnar body 211 and is in substantially tight contact with and is disposed between the flange 212 of the insert nut 21 and the inner surface 11 of the shell 11. As such, a junction of the inner surface 11 and the elastic seal 22 is airtight, thereby preventing external water from entering the inner shell space 13 via the through hole 14. Furthermore, the outer surface of the columnar body 211 is further formed with a second groove 215 (see FIG. 4) proximate to a junction of the flange 212 and the columnar body 211 to receive engagingly the elastic seal 22. Through this configuration, the elastic seal 22 can be stably and fixedly sleeved on the columnar body 211 and cannot be easily disengaged therefrom.

Figure 10:
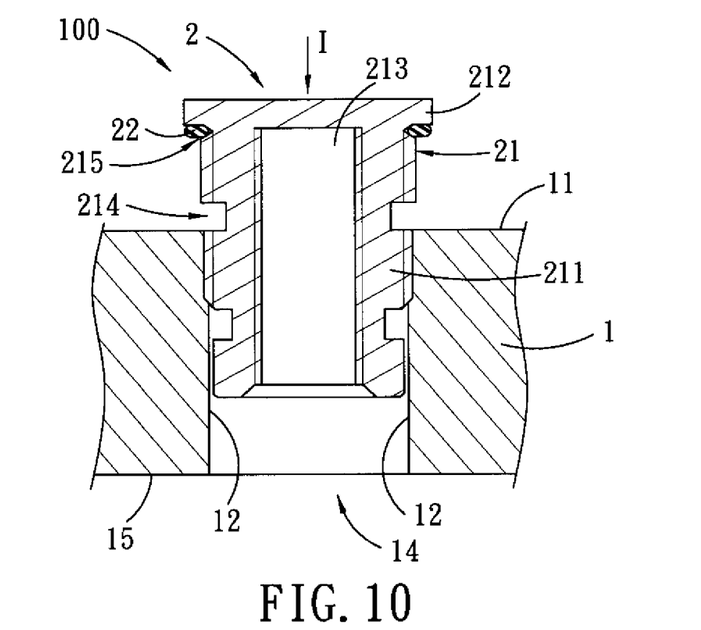
FIG. 10 is a fragmentary sectional view, illustrating the insert nut of FIG. 9 being pressed into the through hole of the shell.
Figure 11:
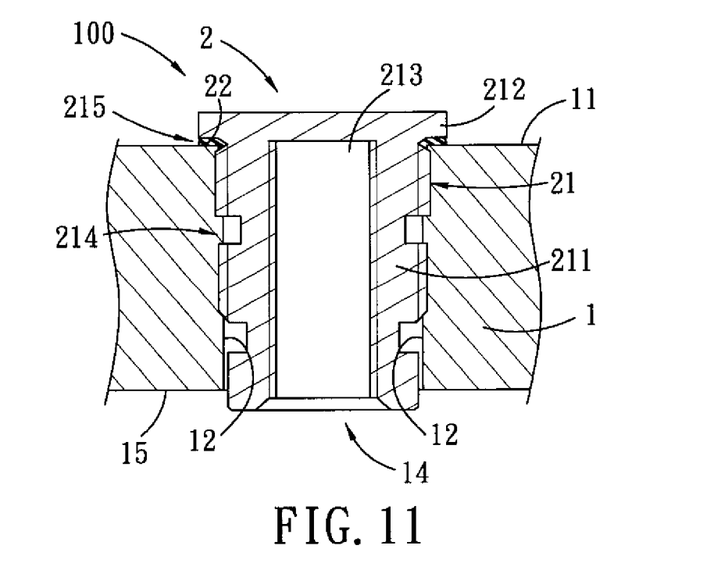
FIG. 11 is a view similar to FIG. 10, but illustrating the insert nut being pressed into the through hole of the shell until an elastic seal abuts against an inner surface of the shell.

Referring to FIGS. 10 and 11, in combination with FIG. 5, in step 91, the elastic seal 22 is sleeved on the columnar body 211 of the insert nut 21 until the elastic seal 22 is received engagingly in the second groove 215, and in step 92, the flange 22 of the insert nut 21 is heated and is pressed in the direction of the arrow (I) until the elastic seal 22 abuts against the inner surface 11 of the shell 1 (see FIG. 11). The insert nut 21 cannot be further moved at this time. After the melted material solidified, the elastic seal 22 is positioned in a substantially tight contact with the inner surface 11. Thus, good airtight and waterproof effects can be achieved in the junction of the elastic seal 22 and the inner surface 11.

In summary, by sleeving the elastic seal 22 on the insert nut 21 of the insert nut structure 2 and by using a thermal welding method to fix the insert nut 21 in the through hole 14 of the shell 1, the insert nut 21 can be conveniently assembled on the shell 1, so that a good waterproof effect between the shell 1 and the insert nut 21 can be achieved. This results in reducing the assembling time and increasing the resistance force against screw pull-out. Hence, the objects of the present invention can be realized.

While the present invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A nut and shell assembly comprising:
   a shell having an inner surface that defines an inner shell space, and a through hole to communicate said inner shell space with the outside; and
   an insert nut structure including an insert nut fixed in said through hole by hot-melting from an interior to an exterior of said shell, and an elastic seal sleeved on said insert nut and in substantially tight contact with said shell in said through hole, said insert nut including
   a columnar body fixed in said through hole, and
   a flange connected to one end of said columnar body, having an outer diameter greater than that of said columnar body, and abutting against said inner surface of said shell;
   wherein said shell further has a hole-defining wall that defines said through hole, said elastic seal being in substantially tight contact with said hole defining wall;
   wherein said insert nut has an outer surface formed with a first groove, said elastic seal being received engagingly in said first groove; and
   wherein said first groove extends inwardly from the center of said outer surface of said insert nut.

2. The nut and shell assembly as claimed in claim 1, wherein said outer surface of said insert nut is further formed with a second groove proximate to a junction of said flange and said columnar body for receiving engagingly another plastic seal that is identical to said plastic seal.

3. The nut and shell assembly as claimed in claim 1, wherein said elastic seal is made of one of natural rubber and synthetic rubber.

4. The nut and shell assembly as claimed in claim 1, wherein said columnar body and said flange are integrally formed.

5. An insert nut structure adapted to be fixed to a shell, the shell having an inner surface that defines an inner shell space, and a through hole to communicate the inner shell space with the outside, said insert nut structure comprising:
   an insert nut adapted to be fixed in the through hole by hot-melting from an interior to an exterior of the shell, and including a columnar body that is adapted to be fixed in the through hole, and a flange that connected to one end of said columnar body, said flange having an outer diameter greater than that of said columnar body; and
   an elastic seal sleeved on said insert nut;
   wherein said columnar body ahs an outer surface formed with a first groove, said elastic seal being received engagingly in said first groove; and
   wherein said first groove extends inwardly from the center of said outer surface of said columnar body.

6. The insert nut structure as claimed in claim 5, wherein said outer surface of said insert nut is further formed with a second groove proximate to a junction of said flange and said columnar body for receiving engagingly another plastic seal that is identical to said plastic seal.

7. The insert nut structure as claimed in claim 5, wherein said elastic seal is made of one of natural rubber and synthetic rubber.

8. The insert nut structure as claimed in claim 5, wherein said columnar body and said flange are integrally formed.

\* \* \* \* \*